(12) United States Patent
Wang et al.

(10) Patent No.: US 12,511,550 B2
(45) Date of Patent: Dec. 30, 2025

(54) ADAPTIVE GENETIC ALGORITHM FOR MANAGING AND SCHEDULING CROSS-DOMAIN HETEROGENEOUS STORAGE CLUSTERS

(71) Applicants: Shandong Provincial Computing Center (National Supercomputing Center in Jinan), Shandong (CN); Qilu University of Technology (Shandong Academy of Sciences), Shandong (CN)

(72) Inventors: Yinglong Wang, Shandong (CN); Chunxiao Wang, Shandong (CN); Qiuyue Liu, Shandong (CN); Meihong Yang, Shandong (CN); Ying Guo, Shandong (CN); Xiaoming Wu, Shandong (CN); Zhigang Zhao, Shandong (CN); Jing Chen, Shandong (CN); Jian Zhang, Shandong (CN)

(*) Notice: Subject to any disclaimer, the term of this patent is extended or adjusted under 35 U.S.C. 154(b) by 0 days.

(21) Appl. No.: 19/278,730

(22) Filed: Jul. 23, 2025

(65) Prior Publication Data
US 2025/0348757 A1 Nov. 13, 2025

Related U.S. Application Data

(63) Continuation of application No. PCT/CN2024/120279, filed on Sep. 23, 2024.

(30) Foreign Application Priority Data

Apr. 10, 2024 (CN) .......................... 202410428516.X

(51) Int. Cl.
*G06N 3/12* (2023.01)
*G06N 7/01* (2023.01)
*G06N 20/00* (2019.01)

(52) U.S. Cl.
CPC ................ *G06N 3/12* (2013.01); *G06N 7/01* (2023.01); *G06N 20/00* (2019.01)

(58) Field of Classification Search
CPC ............. G06N 3/12; G06N 7/01; G06N 20/00
See application file for complete search history.

(56) References Cited

U.S. PATENT DOCUMENTS

2005/0143845 A1   6/2005   Kaji

FOREIGN PATENT DOCUMENTS

| CN | 113687780 A | 11/2021 |
| CN | 114243791 A | 3/2022 |

(Continued)

OTHER PUBLICATIONS

Gopu et al., "Energy-efficient virtual machine placement in distributed cloud using NSGA-III algorithm", 2023, Journal of Cloud Computing, vol. 12, pp. 1-20 (Year: 2023).*

(Continued)

*Primary Examiner* — Leonard A Sieger

(57) ABSTRACT

The present disclosure provides a method and a system for managing and scheduling a cross-domain heterogeneous storage cluster. With optimization objectives of minimizing the total storage cost, maximizing the total throughput and minimizing a distance between a to-be-stored dataset and a position of a storage system where the storage is about to perform, constraint conditions are solved by adopting a non-dominated sorting genetic algorithm, and an optimal storage position is selected. Accordingly, the data access performance is improved, the latency is reduced, and the unnecessary consumption of network bandwidth and storage resources is reduced.

4 Claims, 4 Drawing Sheets

(56) References Cited

FOREIGN PATENT DOCUMENTS

| CN | 116208567 A | 6/2023 |
| CN | 117093131 A | 11/2023 |

OTHER PUBLICATIONS

Miriam et al., "Non-dominated Sorting Genetic Algorithm (NSGA-III) for effective resource allocation in cloud", 2020, Evolutionary Intelligence, vol. 14, pp. 759-765 (Year: 2020).*

Deb et al., "An Evolutionary Many-Objective Optimization Algorithm Using Reference-Point-Based Nondominated Sorting Approach, Part I: Solving Problems With Box Constraints", 2013, IEEE Transactions on Evolutionary Computation, vol. 18, pp. 577-601 (Year: 2013).*

Feng et al., "The Optimal Global Path Planning of Mobile Robot Based on Improved Hybrid Adaptive Genetic Algorithm in Different Tasks and Complex Road Environments", Jan. 24, 2024, IEEE Access, vol. 12, pp. 18400-18415 (Year: 2024).*

Chao Zhang et al., A distributed power supply optimization configuration method considering reactive power compensation, Hydropower and Pumped Storage, Apr. 20, 2020, pp. 36-41, vol. 6, No. 2.

Notice of Allowance of counterpart Chinese Patent Application No. 202410428516.X issued on Dec. 8, 2024.

1st Office Action of counterpart Chinese Patent Application No. 202410428516.X issued on Oct. 13, 2024.

Supplementary Search Report of counterpart Chinese Patent Application No. 202410428516.X issued on Nov. 22, 2024.

First Search Report of counterpart Chinese Patent Application No. 202410428516.X issued on Oct. 12, 2024.

\* cited by examiner

| dataset | N1 | N2 | N3 | N4 | N5 | N6 | N7 | N8 | N9 |
|---|---|---|---|---|---|---|---|---|---|
| gene library | 1 | 1 | 3 | 2 | 5 | 1 | 4 | 2 | 5 |

Fig. 3

ADAPTIVE GENETIC ALGORITHM FOR MANAGING AND SCHEDULING CROSS-DOMAIN HETEROGENEOUS STORAGE CLUSTERS

CROSS-REFERENCE TO RELATED APPLICATIONS

The present application is a Continuation Application of PCT Application No. PCT/CN2024/120279 filed on Sep. 23, 2024, which claims the priority of Chinese patent application entitled "METHOD AND SYSTEM FOR MANAGING AND SCHEDULING CROSS-DOMAIN HETEROGENEOUS STORAGE CLUSTER" submitted on Apr. 10, 2024, with the application number of 202410428516X, the entire contents of which are incorporated herein by reference.

TECHNICAL FIELD

The present disclosure belongs to the technical field of distributed virtual storage, and particularly to a method and a system for managing and scheduling a cross-domain heterogeneous storage cluster.

BACKGROUND

The statement in this section is provided solely for the purpose of providing the background information related to the present disclosure and does not necessarily constitute the prior art.

With the development of big data, cloud computing and Internet of Things, data from various trades and industries has shown the explosive growth, and mining and effectively using massive data information have become the strategic core of enterprise development and scientific and technological progress. However, these massive data often exist in different storage systems, the storage systems can not directly access each other since different access protocols and interfaces are used, making it difficult to achieve unified management and sharing. When it is necessary for a plurality of data centers to concurrently process the massive data, a data migration or duplicate storage manner is generally adopted, which seriously affects the data processing efficiency. Therefore, it is urgent to seamlessly integrate storage systems in different regions, build a storage base based on a data-intensive application, and realize the unified management and scheduling of heterogeneous storage systems.

In this context, a solution is provided due to a fact that a distributed virtual storage system exists. The distributed virtual storage system virtualizes the storage systems scattered in the different regions through a distributed architecture, builds a unified storage pool, and realizes sharing of the data among different storage systems across geographical restrictions, such as HDFS, Ceph and Alluxio. The Alluxio is an open-source distributed virtual storage system which builds a unified namespace on heterogeneous physical storage resources, abstracts storage media into a shared file system, and achieves the centralized storage of the scattered data. An existing distributed file system has adopted a mechanism of storing the data by the traditional local file system, that is, the data is persistently stored by using a hard disk storage firstly; when an access request for a file datum is received, it is further necessary to firstly find a datum corresponding to the file datum in a hard disk, and operate the datum in various ways after being placed in a memory; and the datum located in the memory is usually moved out of the memory some time after being accessed. The processes of accessing the data are similar, involving cumbersome steps and taking a long time.

Therefore, how to improve the data access performance, reduce the latency, and reduce the unnecessary consumption of network bandwidth and storage resources in a distributed virtual storage system is a technical problem that needs to be addressed at present.

SUMMARY

In order to overcome the deficiencies of the prior art, the present disclosure provides a method and a system for managing and scheduling a cross-domain heterogeneous storage cluster. Constraint conditions of a constructed multi-objective optimization model are solved by adopting a non-dominated sorting genetic algorithm, and an optimal storage position is selected. Accordingly, the data access performance is improved, the latency is reduced, and the unnecessary consumption of network bandwidth and storage resources is reduced.

In order to achieve the purpose, a first aspect of the present disclosure provides a method for managing and scheduling a cross-domain heterogeneous storage cluster, including:
  constructing a storage scheduling multi-objective optimization model according to storage costs and throughputs of storing different to-be-stored datasets on different storage systems as well as relative positions of the to-be-stored datasets and the different storage systems; and
  constructing constraint conditions, optimizing and solving a multi-objective optimization problem by adopting a non-dominated sorting genetic algorithm with objectives of minimizing the total storage cost of all the to-be-stored datasets, maximizing the total throughput of all the to-be-stored datasets, and minimizing a distance between the to-be-stored datasets and a position of a storage system where the storage is about to perform, so as to obtain a set of Pareto optimal solutions of the multi-objective optimization model meeting the constraint conditions, and obtaining a storage scheduling result of the to-be-stored datasets according to the set of Pareto optimal solutions.

A second aspect of the present disclosure provide a system for managing and scheduling a cross-domain heterogeneous storage cluster, as shown in FIG. 1, including:
  a multi-objective optimization model constructing module, which is configured to construct a storage scheduling multi-objective optimization model according to storage costs and throughputs of storing different to-be-stored datasets on different storage systems as well as relative positions of the to-be-stored datasets and the different storage systems; and
  a multi-objective optimization model solving module, which is configured to construct constraint conditions, optimize and solve a multi-objective optimization problem by adopting a non-dominated sorting genetic algorithm with objectives of minimizing the total storage cost of all the to-be-stored datasets, maximizing the total throughput of all the to-be-stored datasets, and minimizing a distance between the to-be-stored datasets and a position of a storage system where the storage is about to perform, so as to obtain a set of Pareto optimal solutions of the multi-objective optimization model meeting the constraint conditions, and obtain a storage scheduling result of the to-be-stored datasets according to the set of Pareto optimal solutions.

A third aspect of the present disclosure provides a computer device, including a processor, a memory and a bus, wherein the memory stores a machine-readable instruction executable by the processor, when the computer device is operated, the processor is communicated with the memory through the bus, and the machine-readable instruction performs a method for managing and scheduling a cross-domain heterogeneous storage cluster when being executed by the processor.

A fourth aspect of the present disclosure provides a computer-readable storage medium stored with a computer program thereon, wherein the computer program performs a method for managing and scheduling a cross-domain heterogeneous storage cluster when being operated by a processor.

One or more of the technical solutions have the following beneficial effects.

In the present disclosure, with optimization objectives of minimizing the total storage cost, maximizing the total throughput, and minimizing the distance between the to-be-stored datasets and the position of the storage system where the storage is about to perform, the constraint conditions are solved by adopting the non-dominated sorting genetic algorithm, and the optimal storage position is selected. Accordingly, the data access performance is improved, the latency is reduced, and the unnecessary consumption of network bandwidth and storage resources is reduced.

The advantages of additional aspects of the present disclosure will be presented partially in the description below, will partially become apparent from the description below, or will be known through the practice of the present disclosure

BRIEF DESCRIPTION OF DRAWINGS

Accompanying drawings of the description forming a part of the present disclosure are used to provide further understanding of the present disclosure. Schematic embodiments of the present disclosure and their descriptions are provided for the purpose of explaining the present disclosure and do not constitute an improper limitation of the present disclosure.

FIG. 3 shows an example diagram of encoding and decoding manners in the embodiment 1 of the present disclosure.

DETAILED DESCRIPTION OF THE EMBODIMENTS

It should be noted that the following detailed descriptions are exemplary and are intended to provide further illustration of the present disclosure. Unless otherwise indicated, all technical and scientific terms used herein have the same meanings as are generally understood by those skilled in the art to which the present disclosure belongs.

It should be noted that terms used herein are only intended to describe specific embodiments and are not intended to limit exemplary embodiments according to the present disclosure.

In the absence of conflict, the embodiments of the present disclosure and features in the embodiments may be combined with each other.

Embodiment 1

Figure 1:
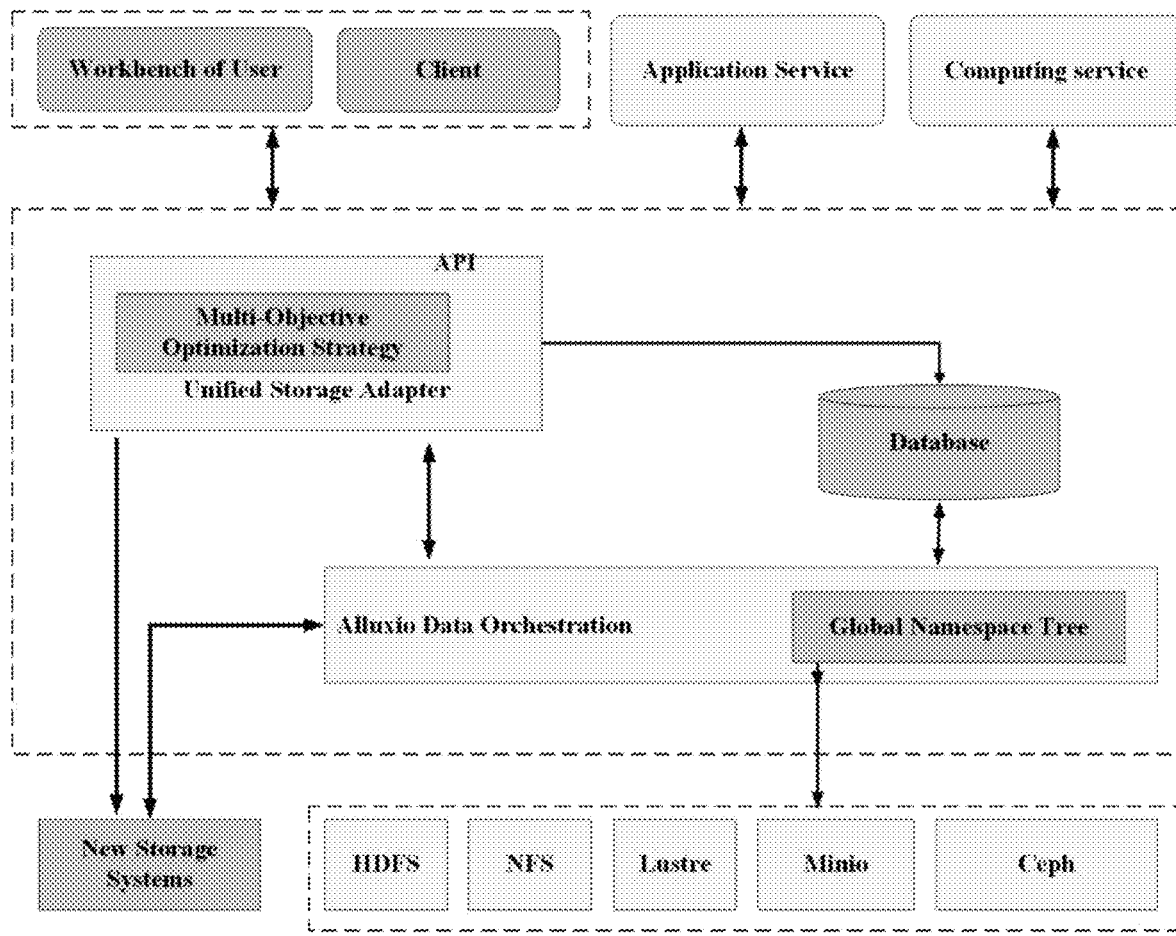
FIG. 1 shows an overall framework diagram of a cross-domain heterogeneous storage system in an embodiment 1 of the present disclosure.

This embodiment discloses a method for managing and scheduling a cross-domain heterogeneous storage cluster, as shown in FIG. 1, including:

constructing a storage scheduling multi-objective optimization model according to storage costs and throughputs of storing different to-be-stored datasets on different storage systems as well as relative positions of the to-be-stored datasets and the different storage systems; and constructing constraint conditions, optimizing and solving a multi-objective optimization problem by adopting a non-dominated sorting genetic algorithm with objectives of minimizing the total storage cost of all the to-be-stored datasets, maximizing the total throughput of all the to-be-stored datasets, and minimizing a distance between the to-be-stored datasets and a position of a storage system where the storage is about to perform, so as to obtain a set of Pareto optimal solutions of the multi-objective optimization model meeting the constraint conditions, and obtaining a storage scheduling result of the to-be-stored datasets according to the set of Pareto optimal solutions.

This embodiment is described by taking an open-source Alluxio as an example of a storage layer abstraction of the cross-domain heterogeneous storage system. The Alluxio is an open-source distributed virtual storage system which builds a unified namespace on heterogeneous physical storage resources, abstracts storage media into a shared file system, and achieves the centralized storage of the scattered data. The system builds a high-availability (HA) Alluxio cluster, and mounts storage systems of a plurality of data centers. In order to facilitate management and access, a global namespace tree is created by using a naming convention of a place name-a storage system name+a number. By creating a data storage adapter at an upper layer, extracting metadata information and providing a data storage optimization strategy, a storage system management capability and a data space management capability are provided for the upper layer.

An overall framework of the cross-domain heterogeneous storage system in this embodiment includes a unified storage adapter, a database and an Alluxio data orchestrator.

Among them, the unified storage adapter is configured to create a data logic space based on input parameters, unified storage views and other information; when a user performs a data operation, automatically select an optimal storage solution for the user with the data logic space, the metadata information, the unified storage view and the other information by extracting the metadata information and building a multi-objective optimization strategy; storing the metadata information, storage position information and other information in a database; and provide an interface for storage service calls for storage and computing tasks of the upper layer.

The database mainly includes relevant information such as a storage system information table, a storage device information table, a data space information table, a user storage table and an operation log table. The storage system information table records relevant information of the storage system, including an ID, an address, a name, a type, a model, a mounting status and the like of the storage system. The storage device table records relevant information of a storage device, including an ID, a model, a manufacturer, hard disk information and the like of the storage device. The data space information table records relevant information of a storage space of the user, including an ID, a name, a quota, a used capacity and a creator of a data space, an ID of a user to which the data space belongs and the like. The user storage table records relevant information of a user storage, including an ID and a name of the user storage, an ID of a user to which the user storage belongs, an ID of a storage system to which the user storage belongs, a storage capacity, a used capacity and the like of the user storage. The operation log table records all operation logs, such as data read/write, system maintenance and other operations, The Alluxio data orchestrator is configured to mount HDFS, NFS, Lustre, minio, QingStor and the like as underlying storage systems to form an intermediate layer. The intermediate layer manages the data in these different storage systems in a unified manner and provides a unified client API for an upper-layer application of the intermediate layer which can seamlessly access and manipulate the data between the different storage systems.

Figure 2:
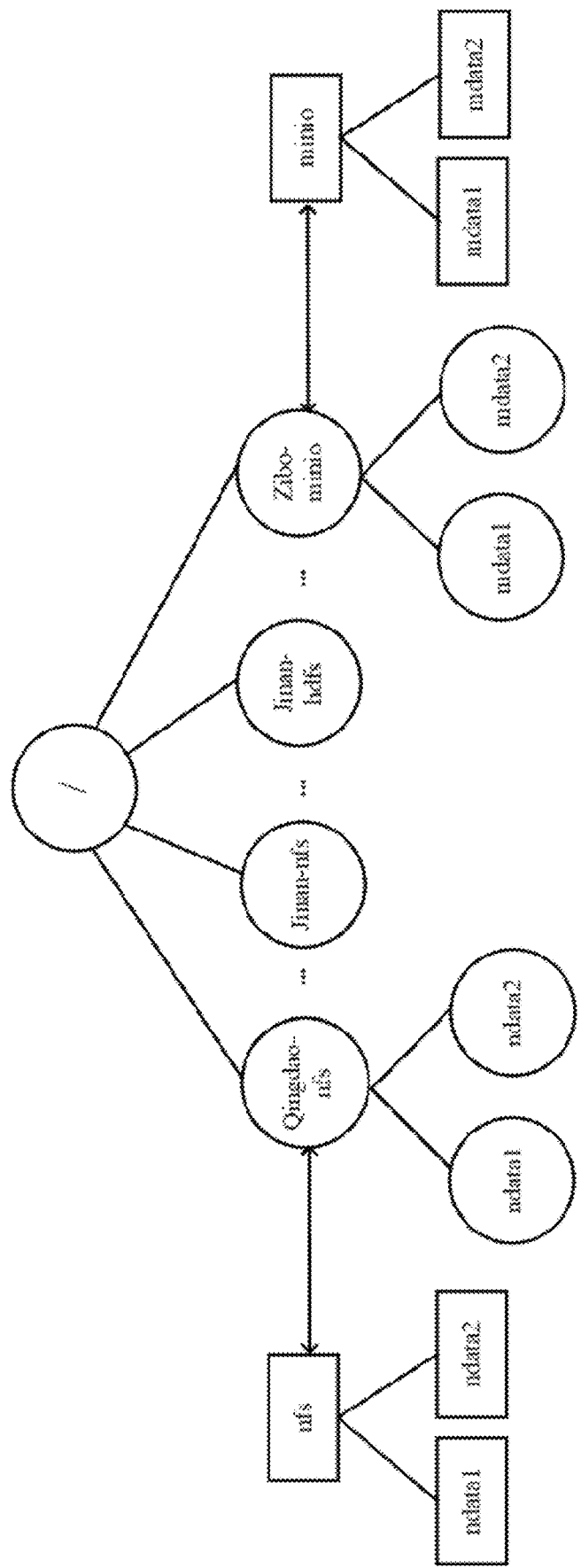
FIG. 2 shows a distribution diagram of different storage systems in the embodiment 1 of the present disclosure.

During the data storage, in order to improve the data management efficiency, a design of a global namespace tree is performed, as shown in FIG. 2, and files and directories of the storage systems are effectively organized by using a tree-like structure, in which root directories are located at the highest layer, and storage systems of data centers are mounted to the root directories. Therefore, regardless of which storage system of the data center the data is stored in, a user can access the data in the storage system by accessing paths in the global namespace tree. The different storage systems are distinguished by adopting a naming convention of a place name-a storage system name+a number, for example, Qingdao-nfs1, which indicates a first NFS storage system located in Qingdao.

When the underlying storage systems are accessed, an appropriate storage solution is selected by an intelligent algorithm, which can effectively reduce the data access time, improve the response speed of the storage systems, optimize the data throughput, and thus improve the overall system performance. Such an automated decision-making process takes into account multiple factors, including storage cost, data access speed, location information, and the like, to comprehensively optimize performance metrics and provide the user with efficient and reliable data access services.

When a problem of automatically selecting an optimal solution for the underlying storage systems is addressed, a multi-objective optimization problem is solved by adopting an NSGA-III algorithm. Firstly, three objective functions of total cost, total throughput and location information are modelled. A screening mechanism is introduced in a population initialization stage to retain adequate individuals, improve the quality of an original population, and promote the algorithm to explore a search space of excellent solutions in a more targeted manner. An adaptive algorithm introduced in a crossover-mutation stage dynamically adjusts a crossover probability and a mutation probability to balance needs of global search and local search in the search space. Reference points are introduced and adaptively adjusted by a reference point-based niche preservation strategy, so as to generate diverse and evenly distributed solutions. Such a method of generating the reference points improves the exploration ability of the algorithm in a multi-objective storage system selection problem and helps to search for a set of potential Pareto optimal solutions.

It is assumed that there are n to-be-stored datasets which need to be stored and accessed on m storage systems, wherein the datasets have different storage and access needs, the storage systems have different costs, throughputs and location information, and different storage solutions can result in different performance outcomes. A goal of the multi-objective storage system selection problem is to select the storage system reasonably for each dataset, so as to minimize the total cost, maximize the total throughput, and fully consider the location information of the storage system.

In order to select the approximate storage system, it is necessary to understand the cost, throughput and location information of the storage system. Quotes are obtained from different vendors and compared and analyzed based on costs in terms of hardware, software, operations, and the like. Performance metrics of the storage systems are monitored by using a performance monitoring tool in real time. The geographic distribution of the storage systems is recorded, for example, whether the storage systems are in the same data center, different data centers, and the like.

Three objective functions, namely, cost minimization, throughput maximization, and nearest storage location, are defined for this problem.

1. Total Cost

Transmission cost and storage cost are included.

$$\min F_1 = \sum_{i=1}^{n} \sum_{j=1}^{m} (C1_{ij} + C2_{ij}) \cdot x_{ij}$$

wherein n represents the number of the to-be-stored datasets, m represents the number of the storage systems, $x_{ij}$ represents a binary variable indicating whether the $i^{th}$ dataset is stored on the $j^{th}$ storage system, $C1_{ij}$ represents the transmission cost of the $i^{th}$ dataset being stored on the $j^{th}$ storage system, and $C2_{ij}$ represents the storage cost of the $i^{th}$ dataset being stored on the $j^{th}$ storage system.

Among them, the quotes can be obtained from the different vendors and compared and analyzed based on the costs in terms of the hardware, the software, the operations, and the like.

2. Total Throughput $$\max F_2 = \sum_{i=1}^{n} \sum_{j=1}^{m} T_{ij} \cdot x_{ij}$$

wherein $t_{ij}$ represents the throughput of the dataset i stored on the storage system j, and $x_{ij}$ represents a binary variable indicating whether the $i^{th}$ dataset is stored on the storage system j.

3. Position Objective Function $$\max F_3 = \sum_{i=1}^{n} \sum_{j=2}^{m} \text{Score}_{ij} \cdot x_{ij}$$

wherein $\text{score}_{ij}$ represents a score taking into account an influence of the location information of the storage system on the dataset i. For example, if the storage system and the dataset are in the same data center, the score is higher; and if the storage system and the dataset are in the different data centers, the score is lower.

Constraint Conditions:

1. Each dataset can only be stored on one storage system:

$$\sum_{j=1}^{m} x_{ij} = 1, \quad \forall\, i \in 1, 2, \ldots, n$$

2. The size of the dataset cannot exceed the remaining capacity of the storage system:

$$\sum_{i=1}^{n} datasize_i \cdot x_{ij} \leq remaining\_capacity_j \quad \forall\, j \in 1, 2, \ldots, m$$

wherein $datasize_i$ represents a size of the $i^{th}$ dataset, and $remaining\_capacity_j$ represents the remaining capacity of the storage system j.

3. Binary Variable Constraints:

$$x_{ij} \in \{0, 1\}, \quad \forall\, i \in 1, 2, \ldots, m \quad \forall\, j \in 1, 2, \ldots, m$$

In an evolutionary algorithm to solve the multi-objective storage system selection problem, an original population $P_t$ with a population size of N and a set of random reference points are firstly generated, the original population is screened, and then an offspring population $Q_t$ with a size of N is obtained through adaptive crossover and mutation operations. The original population $P_t$ and the offspring population $Q_t$ are merged to obtain a population $R_t$ of a size of 2N. The $R_t$ is divided into different non-dominated ranks by using a non-dominated sorting manner. Then, the reference points are adaptively adjusted by using a reference point-based niche preservation strategy, such that exactly N reference points meet a condition of $\rho_j=1$. Finally these N reference points are used as a parent population of the next iteration. Ultimately, the algorithm generates an optimized set of solutions through continuous iterations until the predetermined number of iterations is reached. The storage system the remaining storage capacity of which is largest is selected as the optimal solution to meet the requirements for the storage systems in practical applications, so as to ensure the quality of the solution and the efficiency of selecting the storage system.

A solving process is described as follows.

(1) Population Initialization

In a population initialization stage, a screening mechanism is introduced in addition to a method of randomly generating original chromosomes. The screening mechanism imposes restrictions on the remaining capacity and throughput of the storage system of the original population, and sets thresholds for the remaining capacity and throughput of the storage system. For each originally generated chromosome, it is determined whether the remaining capacity and throughput of the storage system corresponding to the originally generated chromosome meet the requirements, and the chromosomes that cannot meet the performance requirements are eliminated at the population initialization stage, such that the similarity between the chromosomes is significantly reduced and the algorithm is enabled to explore a space of excellent solutions in a more targeted manner.

Among them, in this embodiment, each chromosome represents a possible solution, i.e., a solution in which all the to-be-stored datasets are allocated to the storage system.

(2) Encoding

Because an encoding manner adopted by a standard NSGA-III algorithm is not suitable for a problem raised in the embodiment, this embodiment adopts a real number encoding manner to determine a storage system selection scheme for each dataset. The length of the chromosome is n indicating n to-be-stored datasets, and an array of a length of m represents m selectable storage systems, and a storage system number is assigned to a position corresponding to a gene string, indicating that the dataset is allocated to the corresponding storage system.

(3) Decoding

Each coding section in the chromosome is traversed, with each section representing storage system selection for one dataset. The integer encoding of each dataset is mapped to a specific storage system number. A corresponding storage system is assigned to each dataset based on a mapping result, and a list of scheduling schemes is updated.

FIG. 3 shows how to perform encoding and decoding in an instance consisting of five storage systems and nine datasets. A solution represented by the example is described as follows: datasets N1, N2 and N6 are assigned to a storage system M1, datasets N4 and N8 are assigned to a storage system M2, a dataset N3 is assigned to a storage system M3, a dataset N7 is assigned to a storage system M4, and datasets N5 and N9 are assigned to a storage system M5.

(4) Crossover and Mutation

A simulated binary crossover operator (SBX) and a polynomial mutation are employed. The SBX adopts a uniform distribution manner for gene crossover, which can evenly mix genes, and avoid a situation that a better solution cannot be searched because a local optimal solution is trapped when the multi-objective storage system selection is solved. The polynomial mutation introduces a certain degree of random perturbation, which is helpful to introduce the diversity in the search space of this problem, so as to better explore possible solutions. In a solving process, an adaptive algorithm is introduced to dynamically adjust a crossover probability (Pc) and a mutation probability (Pm), an update range of individuals in a population is dynamically adjusted according to the number of evolutionary generations and a distance between the individuals, and evolutionary directions of the crossover probability and mutation probability are determined. When the distance between an individual and its nearest individual is less than an average distance between the individuals, the crossover probability and the mutation probability are increased with the increase of the number of iterations to enhance the global search ability and ensure that the algorithm searches the solution space more extensively. When the distance between the individual and its nearest individual is greater than the average distance between the individuals, the crossover probability and the mutation probability are reduced with the increase of the number of iterations to refine the local search and more focus on the fine adjustment of the local optimal solution.

Among them, formulas for calculating the crossover probability and the mutation probability are described as follows:

$$Pc = \begin{cases} \dfrac{Pc1 + Pc2}{2} + \left(Pc1 - \dfrac{Pc1 + Pc2}{2}\right) \times \left(1 - \dfrac{t}{T}\right)^{\alpha} & d(t) < davg(t) \\ \dfrac{Pc1 + Pc2}{2} & d(t) < davg(t) \\ \dfrac{Pc1 + Pc2}{2} - \left(\dfrac{Pc1 + Pc2}{2} - Pc2\right) \times \left(1 - \dfrac{t}{T}\right)^{\alpha} & d(t) < davg(t) \end{cases}$$

-continued $$Pm = \begin{cases} \frac{Pm1+Pm2}{2} + \left(Pm1 - \frac{Pm1+Pm2}{2}\right) \times \left(1-\frac{t}{T}\right)^\alpha & d(t) < davg(t) \\ \frac{Pm1+Pm2}{2} & d(t) < davg(t) \\ \frac{Pm1+Pm2}{2} - \left(\frac{Pm1+Pm2}{2} - Pm2\right) \times \left(1-\frac{t}{T}\right)^\alpha & d(t) < davg(t) \end{cases}$$

wherein Pc1 and Pc2 represent the maximum value and the minimum value of the originally-set crossover probability, Pm1 and Pm2 represent the maximum value and the minimum value of the originally-set mutation probability, T represents the maximum number of iterations of the population, t represents the current number of iterations, a represents a constant, d(t) represents the distance between the individual and its nearest individual, and dagv(t) represents the average distance between the individuals.

(5) Reference Point-Based Selection Mechanism

A population obtained from the crossover and the mutation is divided into a plurality of non-dominated layers (F1, F2, . . . ) by non-dominated sorting after being merged with the parent population; and then, a new population is constructed from the non-dominated layer F1 until its size is N or exceeds N for the first time, and the last layer is a $l^{th}$ layer. A solution above a $(l+1)^{th}$ layer is eliminated; and in most cases, only a fraction of individuals in the lth layer are accepted, and the individuals in the lth layer are selected by the NSGA-III in a reference point-based manner.

Due to the constraint conditions, a feasible area of the algorithm may only occupy a small part of the whole region. However, the reference points are evenly distributed in a target space, which leads to a fact that some reference points are not utilized, while those utilized may establish connections with a plurality of individuals, failing to achieve good distribution and thus affecting the convergence of the algorithm. Therefore, by adopting the adaptive method proposed by Deb, the algorithm can identify the reference points that do not conform to a set of evenly distributed Pareto optimal points. After $P_{t+1}$s with a quantity of N are generated, two new operations of introducing new reference points and eliminating useless reference points and always keeping the number of the populations and the number of the selected reference points equal are introduced.

The new reference points are introduced: after $P_{t+1}$ individuals are generated, the number $\rho_j$ of niches for each reference point is updated. When all the reference points have non-dominated individuals, let $\rho_j=1$. If $\rho_j \geq 2$ for certain reference points, $\rho_k=0$ for some reference points. At this time, if a reference point k is valid, it is necessary to find an associated individual for the reference point k, replace the reference point k with a new reference point close to a reference point j, and add a set of reference points around the reference point j. If $\rho_j \geq 2$ for a plurality of reference points, the above steps are repeated for each reference point.

The useless reference points are eliminated: the number of niches for all the reference points is updated, if there are exactly N reference points meeting $\rho_j=1$, that is, one of the N reference points associated with the individuals in the $P_{t+1}$, this indicates that the distribution between the reference points is uniform, and the increased reference points (excluding original reference points) meeting $\rho_j=0$ are eliminated.

The above adaptive operation is integrated in this solution. In this way, the reference points are dynamically adjusted to maintain uniform distribution, and the search effect of the algorithm on the Pareto front of the multi-objective storage system selection problem is improved.

Figure 4:
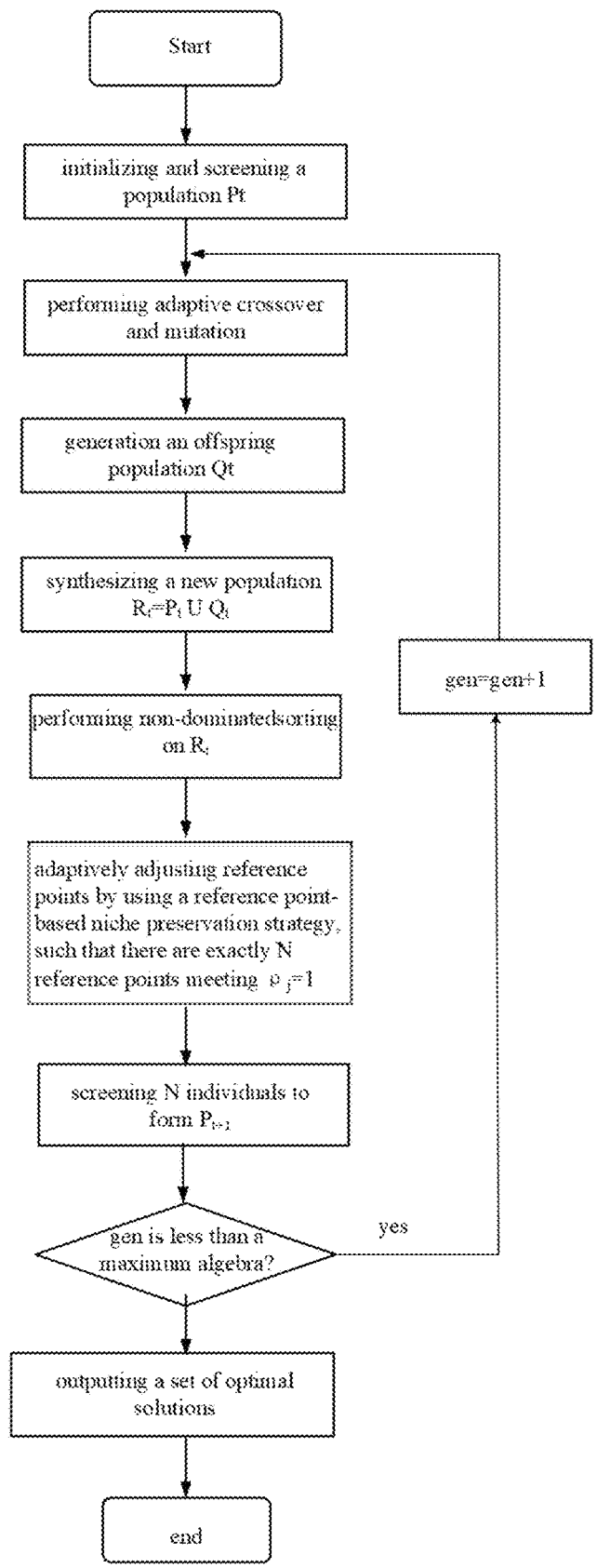
FIG. 4 shows a flowchart of solving a non-dominated sorting-based genetic algorithm in the embodiment 1 of the present disclosure.

The storage location adaptive algorithm of this solution automatically selects an optimal storage location based on performance metrics of storage resources by using an intelligent decision-making strategy. The algorithm flow is shown in FIG. 4. The algorithm helps improve the data access performance, decrease the latency, and reduce the unnecessary consumption of network bandwidth and storage resources. The user does not need to manually select a storage location, and the system automatically provides the storage system with the optimal storage experience.

Embodiment 2

This embodiment aims at providing a system for managing and scheduling a cross-domain heterogeneous storage cluster, including:

a multi-objective optimization model constructing module, which is configured to construct a storage scheduling multi-objective optimization model according to storage costs and throughputs of storing different to-be-stored datasets on different storage systems as well as relative positions of the to-be-stored datasets and the different storage systems; and a multi-objective optimization model solving module, which is configured to construct constraint conditions, optimize and solve a multi-objective optimization problem by adopting a non-dominated sorting genetic algorithm with objectives of minimizing the total storage cost of all the to-be-stored datasets, maximizing the total throughput of all the to-be-stored datasets, and minimizing a distance between the to-be-stored datasets and a position of a storage system where the storage is about to perform, so as to obtain a set of Pareto optimal solutions of the multi-objective optimization model meeting the constraint conditions, and obtain a storage scheduling result of the to-be-stored datasets according to the set of Pareto optimal solutions.

Embodiment 3

This embodiment aims at providing a computing apparatus, including a memory, a processor and a computer program stored on the memory and capable of being operated on the processor, wherein the processor implements the steps of the method when executing the program.

Embodiment 4

This embodiment aims at providing a computer-readable storage medium.

The computer-readable storage medium is stored with a computer program thereon, wherein the computer program performs the steps of the method when being executed by a processor.

The steps involved in the apparatus of the embodiments 2, 3 and 4 correspond to those of the method of the embodiment 1. The specific implementation can be referred to the relevant description of the embodiment 1. The term "computer-readable storage medium" should be understood as a single medium or a plurality of media including one or more instruction sets, and should be further understood to include any medium capable of storing, encoding or carrying the instruction set for execution by the processor and enabling the processor to perform any of the methods of the present disclosure.

It should be understood for those skilled in the art that each module or step of the present disclosure may be realized by using a general-purpose computer apparatus, and optionally may be realized by using a program code executable by the computing apparatus, such that the modules or the steps may be stored in a storage apparatus for being executed by the computing apparatus, or the modules or the steps may be separately fabricated into individual integrated circuit modules, or a plurality of modules or steps of the modules or the steps may be fabricated into a single integrated circuit module. The present disclosure is not limited to any particular combination of hardware and software.

Although the detailed description of the present disclosure is described in conjunction with the accompanying drawings, it is not intended to limit the scope of protection of the present disclosure. It should be understood for those skilled in the art that on the basis of the technical solution of the present disclosure, various alternations or variants that can be made by those skilled in the art without any creative labor still fall within the scope of protection of the present disclosure.

What is claimed is:

1. A method for managing and scheduling a cross-domain heterogeneous storage cluster, comprising:
    encoding, by a processor, a plurality of to-be-stored datasets and a plurality of storage systems into chromosomes, wherein each chromosome has a length of n indicating n to-be-stored datasets; and storage system numbers are assigned to positions corresponding to gene strings of the chromosomes, and the storage system numbers indicate that the corresponding to-be-stored datasets are allocated to the corresponding storage systems;
    constructing, by the processor, a storage scheduling multi-objective optimization model according to storage costs and throughputs of storing different to-be-stored datasets on different storage systems as well as relative positions of the to-be-stored datasets and the different storage systems; and
    constructing, by the processor, constraint conditions, optimizing and solving, by the processor, a multi-objective optimization problem by adopting a non-dominated sorting genetic algorithm with objectives of minimizing the total storage cost of all the to-be-stored datasets, maximizing the total throughput of all the to-be-stored datasets, and minimizing a distance between the to-be-stored datasets and a position of a storage system where the storage is about to perform, so as to obtain a set of Pareto optimal solutions of the multi-objective optimization model meeting the constraint conditions, and obtaining a storage scheduling result of the to-be-stored datasets according to the set of Pareto optimal solutions;
    the multi-objective optimization problem is optimized and solved by using a non-dominated sorting genetic algorithm through the following specific procedures:
    initializing a population;
    performing crossover and mutation on individuals in the population by adopting binary crossover operators and polynomial mutation, and generating an offspring population by adaptively adjusting a crossover probability and a mutation probability;
    merging an original population and the offspring population, and dividing the merged population into different non-dominated ranks in a non-dominated sorting manner;
    adaptively adjusting reference points by utilizing a reference point-based niche preservation strategy to generate a parent population of the next iteration; and
    obtaining an optimized set of solutions through continuous iterative updates until the predetermined number of iterations is reached;
    the reference points are adaptively adjusted by using the reference point-based niche preservation strategy, such that there are exactly N reference points meeting $\rho_j=1$, then the increased reference points meeting $\rho_j=0$ are eliminated, and original reference points are not included in the eliminated reference points; wherein N represents a size of an individual in the offspring population, and $\rho_j$ represents the number of niches for the reference points;
    the procedure of performing the crossover and the mutation on the individuals in the population by adopting the binary crossover operators and the polynomial mutation and generating the offspring population by adaptively adjusting the crossover probability and the mutation probability particularly comprises: when the distance between an individual and its nearest individual is less than an average distance between the individuals, increasing the crossover probability and the mutation probability with the increase of the number of iterations; and when the distance between the individual and its nearest individual is greater than the average distance between the individuals, decreasing the crossover probability and the mutation probability with the increase of the number of iterations;
    formulas for calculating the crossover probability and the mutation probability are described as follows:

$$Pc = \begin{cases} \frac{Pc1+Pc2}{2} + \left(Pc1 - \frac{Pc1+Pc2}{2}\right) \times \left(1 - \frac{t}{T}\right)^\alpha & d(t) < davg(t) \\ \frac{Pc1+Pc2}{2} & d(t) < davg(t) \\ \frac{Pc1+Pc2}{2} - \left(\frac{Pc1+Pc2}{2} - Pc2\right) \times \left(1 - \frac{t}{T}\right)^\alpha & d(t) < davg(t) \end{cases}$$

$$Pm = \begin{cases} \frac{Pm1+Pm2}{2} + \left(Pm1 - \frac{Pm1+Pm2}{2}\right) \times \left(1 - \frac{t}{T}\right)^\alpha & d(t) < davg(t) \\ \frac{Pm1+Pm2}{2} & d(t) < davg(t) \\ \frac{Pm1+Pm2}{2} - \left(\frac{Pm1+Pm2}{2} - Pm2\right) \times \left(1 - \frac{t}{T}\right)^\alpha & d(t) < davg(t) \end{cases}$$

wherein Pc1 and Pc2 represent the maximum value and the minimum value of the originally-set crossover probability, Pm1 and Pm2 represent the maximum value and the minimum value of the originally-set mutation probability, T represents the maximum number of iterations of the population, t represents the current number of iterations, $\alpha$ represents a constant, d(t) represents the distance between the individual and its nearest individual, and davg(t) represents the average distance between the individuals;
wherein the constraint conditions include each to-be-stored dataset can only be stored on one storage system; and the size of the to-be-stored dataset is not greater than the remaining capacity of a storage system where the storage is about to perform; and wherein in a population initialization phase, for each initially generated chromosome, it is determined whether threshold requirements for the remaining capacity and throughput of the set storage system are met, and chromosomes that do not meet the requirements are screened out.

2. A system for managing and scheduling a cross-domain heterogeneous storage cluster, comprising:
a processor; and
a memory storing computer-executable instructions that, when executed by the processor, cause the processor to:
encode a plurality of to-be-stored datasets and a plurality of storage systems into chromosomes, wherein each chromosome has a length of n indicating n to-be-stored datasets; and storage system numbers are assigned to positions corresponding to gene strings of the chromosomes, and the storage system numbers indicate that the corresponding to-be-stored datasets are allocated to the corresponding storage systems;
construct a storage scheduling multi-objective optimization model according to storage costs and throughputs of storing different to-be-stored datasets on different storage systems as well as relative positions of the to-be-stored datasets and the different storage systems; and
construct constraint conditions, optimize and solve a multi-objective optimization problem by adopting a non-dominated sorting genetic algorithm with objectives of minimizing the total storage cost of all the to-be-stored datasets, maximizing the total throughput of all the to-be-stored datasets, and minimizing a distance between the to-be-stored datasets and a position of a storage system where the storage is about to perform, so as to obtain a set of Pareto optimal solutions of the multi-objective optimization model meeting the constraint conditions, and obtain a storage scheduling result of the to-be-stored datasets according to the set of Pareto optimal solutions,
the multi-objective optimization problem is optimized and solved by using a non-dominated sorting genetic algorithm through the following specific procedures:
initializing a population;
performing crossover and mutation on individuals in the population by adopting binary crossover operators and polynomial mutation, and generating an offspring population by adaptively adjusting a crossover probability and a mutation probability;
merging an original population and the offspring population, and dividing the merged population into different non-dominated ranks in a non-dominated sorting manner;
adaptively adjusting reference points by utilizing a reference point-based niche preservation strategy to generate a parent population of the next iteration; and
obtaining an optimized set of solutions through continuous iterative updates until the predetermined number of iterations is reached;
the reference points are adaptively adjusted by using the reference point-based niche preservation strategy, such that there are exactly N reference points meeting $\rho_j=1$, then the increased reference points meeting $\rho_j=0$ are eliminated, and original reference points are not included in the eliminated reference points; wherein N represents a size of an individual in the offspring population, and $\rho_j$ represents the number of niches for the reference points;

the procedure of performing the crossover and the mutation on the individuals in the population by adopting the binary crossover operators and the polynomial mutation and generating the offspring population by adaptively adjusting the crossover probability and the mutation probability particularly comprises: when the distance between an individual and its nearest individual is less than an average distance between the individuals, increasing the crossover probability and the mutation probability with the increase of the number of iterations; and when the distance between the individual and its nearest individual is greater than the average distance between the individuals, decreasing the crossover probability and the mutation probability with the increase of the number of iterations;
formulas for calculating the crossover probability and the mutation probability are described as follows:

$$Pc = \begin{cases} \frac{Pc1+Pc2}{2} + \left(Pc1 - \frac{Pc1+Pc2}{2}\right) \times \left(1-\frac{t}{T}\right)^\alpha & d(t) < davg(t) \\ \frac{Pc1+Pc2}{2} & d(t) < davg(t) \\ \frac{Pc1+Pc2}{2} - \left(\frac{Pc1+Pc2}{2} - Pc2\right) \times \left(1-\frac{t}{T}\right)^\alpha & d(t) < davg(t) \end{cases}$$

$$Pm = \begin{cases} \frac{Pm1+Pm2}{2} + \left(Pm1 - \frac{Pm1+Pm2}{2}\right) \times \left(1-\frac{t}{T}\right)^\alpha & d(t) < davg(t) \\ \frac{Pm1+Pm2}{2} & d(t) < davg(t) \\ \frac{Pm1+Pm2}{2} - \left(\frac{Pm1+Pm2}{2} - Pm2\right) \times \left(1-\frac{t}{T}\right)^\alpha & d(t) < davg(t) \end{cases},$$

wherein Pc1 and Pc2 represent the maximum value and the minimum value of the originally-set crossover probability, Pm1 and Pm2 represent the maximum value and the minimum value of the originally-set mutation probability, T represents the maximum number of iterations of the population, t represents the current number of iterations, a represents a constant, d(t) represents the distance between the individual and its nearest individual, and davg(t) represents the average distance between the individuals;
wherein the constraint conditions include each to-be-stored dataset can only be stored on one storage system; and the size of the to-be-stored dataset is not greater than the remaining capacity of a storage system where the storage is about to perform; and
wherein in a population initialization phase, for each initially generated chromosome, it is determined whether threshold requirements for the remaining capacity and throughput of the set storage system are met, and chromosomes that do not meet the requirements are screened out.

3. A computer device, comprising a processor, a memory and a bus, wherein the memory stores a machine-readable instruction executable by the processor, when the computer device is operated, the processor is communicated with the memory through the bus, and the machine-readable instruction, when being executed by the processor, performs the method for managing and scheduling a cross-domain heterogeneous storage cluster according to the claim 1.

4. A non-transitory computer-readable storage medium stored with a computer program thereon, wherein the computer program, when being executed by a processor, performs the method for managing and scheduling a cross-domain heterogeneous storage cluster according to the claim 1.

* * * * *